United States Patent
Vitug Weber et al.

(10) Patent No.: US 12,388,828 B2
(45) Date of Patent: Aug. 12, 2025

(54) MOBILE ID ASSOCIATION TREE FOR CONNECTING SHARED SERVICES

(71) Applicant: Capital One Services, LLC, McLean, VA (US)

(72) Inventors: Joanna Vitug Weber, Glen Allen, VA (US); Ganapathi Madamadakala, Ashburn, VA (US); Cara Weikel, Silver Spring, MD (US); Kyle Al-Shafei, Arlington, VA (US); Swapnav Deka, Plano, TX (US); Brian Murphy, Silver Spring, MD (US)

(73) Assignee: Capital One Services, LLC, McLean, VA (US)

( * ) Notice: Subject to any disclaimer, the term of this patent is extended or adjusted under 35 U.S.C. 154(b) by 272 days.

(21) Appl. No.: 18/297,465

(22) Filed: Apr. 7, 2023

(65) Prior Publication Data
US 2024/0340285 A1    Oct. 10, 2024

(51) Int. Cl.
*H04L 9/40* (2022.01)

(52) U.S. Cl.
CPC ........ *H04L 63/101* (2013.01); *H04L 63/0853* (2013.01); *H04L 63/0861* (2013.01)

(58) Field of Classification Search
CPC .............. H04L 63/101; H04L 63/0853; H04L 63/0861; H04L 63/104
See application file for complete search history.

(56) References Cited

U.S. PATENT DOCUMENTS

| | | | |
|---|---|---|---|
| 2011/0055901 A1* | 3/2011 | Karaoguz | H04L 9/321 713/168 |
| 2015/0039761 A1* | 2/2015 | Patil | G06Q 10/10 709/225 |

OTHER PUBLICATIONS

Mobile Driver's License (mDL) Implementation Guidelines, American Association of Motor Vehicle Administrators (AAMVA), 60 pages. [Retrieved on Mar. 31, 2023 from https://www.aamva.org/getmedia/b801da7b-5584-466c-8aeb-f230cef6dda5/mDL-Implementation-Guidelines-Version-1-2_final.pdf].

The Mobile Driver's License (mDL) and Ecosystem, Secure Technology Alliance, 62 pages. [Retrieved on Mar. 31, 2023 from https://www.securetechalliance.org/wp-content/uploads/Mobile-Drivers-License-WP-FINAL-Update-March-2020-4.pdf].

* cited by examiner

*Primary Examiner* — Izunna Okeke
(74) *Attorney, Agent, or Firm* — Harrity & Harrity, LLP

(57) ABSTRACT

In some implementations, a mobile device may store information related to a mobile ID registered to the mobile device, wherein the mobile ID is an electronic identity document associated with a user of the mobile device. The mobile device may configure, for the mobile ID, a mobile ID association tree that defines one or more groups that each include, as members, the user of the mobile device and one or more additional users that are each associated with a respective mobile ID, wherein the one or more groups are each associated with one or more shared services that are accessible to each member of a corresponding group based on information related to the mobile ID associated with the respective member.

20 Claims, 10 Drawing Sheets

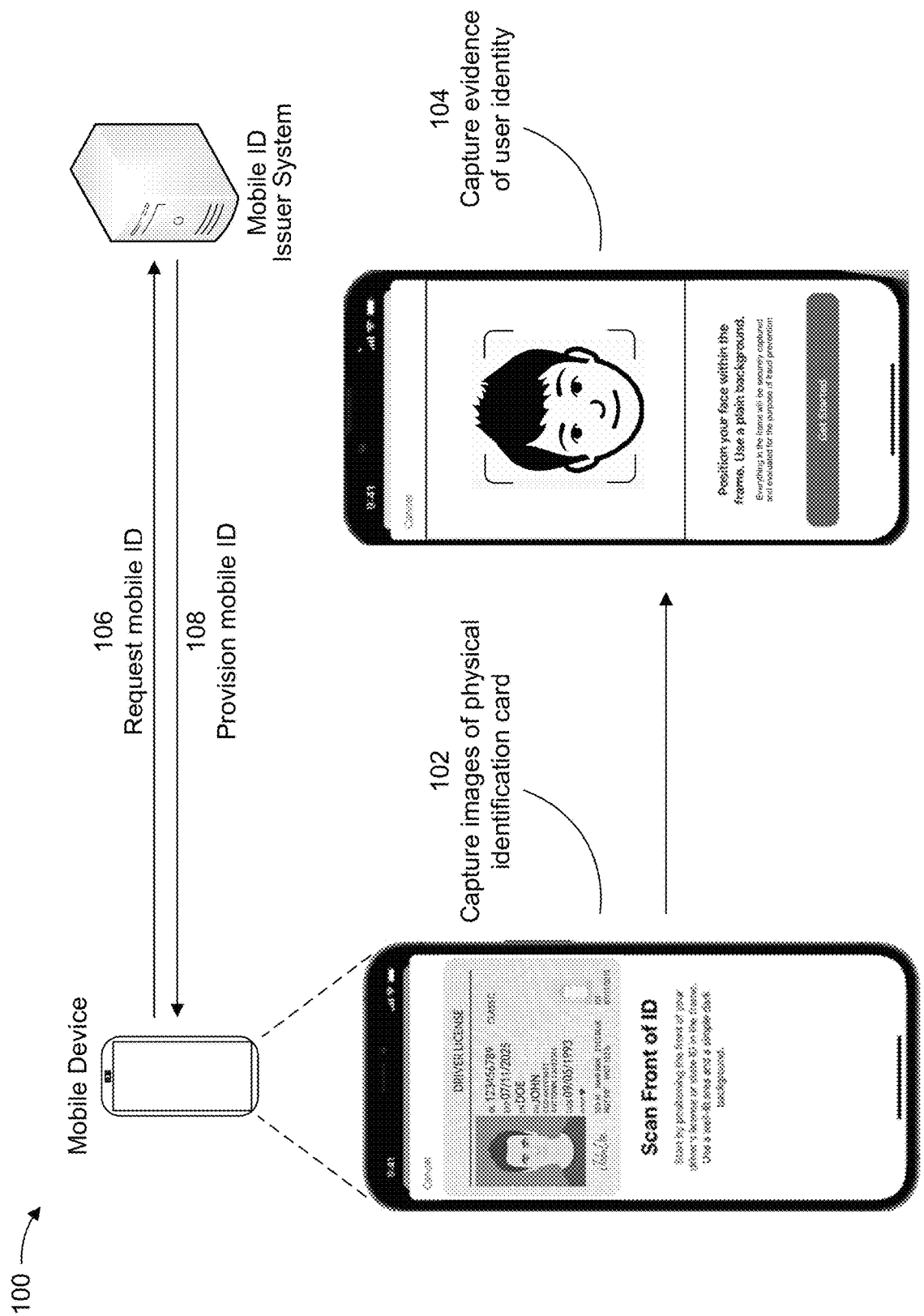

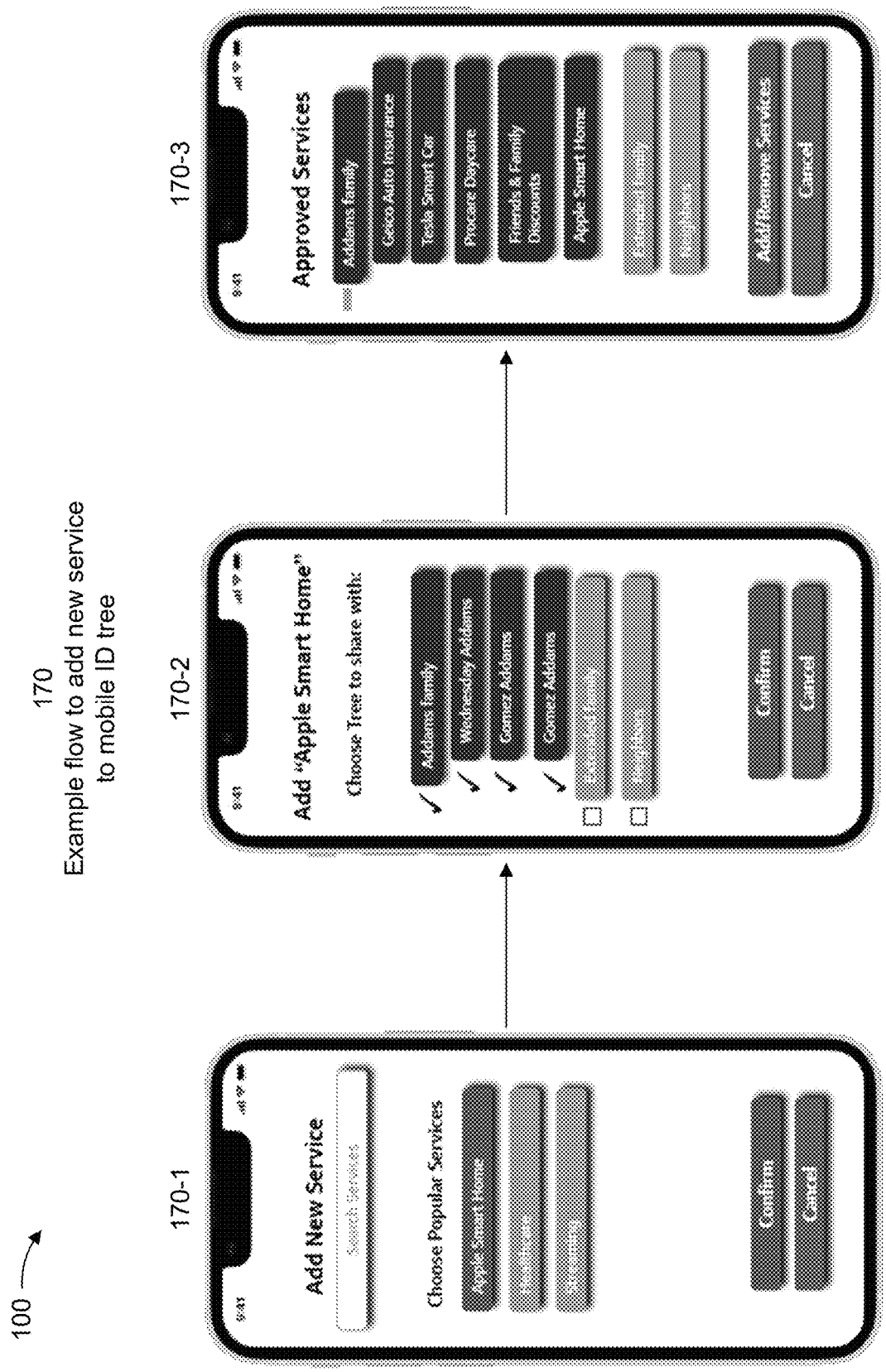

MOBILE ID ASSOCIATION TREE FOR CONNECTING SHARED SERVICES

BACKGROUND

A mobile ID (e.g., a mobile driver's license (mDL)) is an electronic form of identification that is stored on a user device (e.g., a smartphone, a smart watch, or another suitable device) and usable in place of a traditional (e.g., physical) identity document (e.g., a physical driver's license or non-driver identification card). In general, a mobile ID may be issued by a trusted identity provider and/or identity validator, such as a government agency, a bank, and/or a mobile network operator. The purpose of a mobile ID is to provide a secure, convenient, and easily accessible form of identification that can be used for various purposes, such as driving, age verification, or personal identification, among other examples. A mobile ID typically includes the same or similar information that would be found on a traditional identity document, such as a person's name, address, date of birth, photograph, and driver's license number or identification number. The information associated with a mobile ID is typically stored securely on a user device that belongs to the person associated with the mobile ID (e.g., in a secure element), and can be accessed using a mobile application (e.g., a digital wallet application). For example, to use the mobile ID, the person that owns the mobile ID may open the mobile application and display the mobile ID on the screen of the user device or present the user device at a device (e.g., a kiosk) equipped with capabilities to electronically read the mobile ID. The person can then use the mobile ID to identify themselves in various situations, such as during a traffic stop or when traveling, or to prove their age when purchasing age-restricted products (e.g., alcohol or tobacco).

SUMMARY

Some implementations described herein relate to a mobile device for configuring shared services. The mobile device may include one or more memories and one or more processors coupled to the one or more memories. The one or more processors may be configured to store information related to a mobile ID registered to the mobile device, wherein the mobile ID is an electronic identity document associated with a user of the mobile device. The one or more processors may be configured to configure, for the mobile ID, a mobile ID association tree that defines one or more groups that each include, as members, the user of the mobile device and one or more additional users that are each associated with a respective mobile ID, wherein the one or more groups are each associated with one or more shared services that are accessible to each member of a corresponding group based on information related to the mobile ID associated with the respective member. The one or more processors may be configured to present the mobile ID to a verifier system to request access to a shared service, of the one or more shared services associated with the one or more groups in the mobile ID association tree, wherein information related to the mobile ID registered to the mobile device is communicated to the verifier system to prove that the user of the mobile device is authorized to access the shared service based on associations that the mobile ID association tree defines between the one or more groups and the one or more shared services accessible to each member of the corresponding group.

Some implementations described herein relate to a method for leveraging a mobile ID to connect shared services. The method may include storing, by a mobile device, information related to a mobile ID registered to the mobile device, wherein the mobile ID is an electronic identity document associated with a user of the mobile device. The method may include configuring, by the mobile device, for the mobile ID, a mobile ID association tree that defines one or more groups that each include, as members, the user of the mobile device and one or more additional users that are each associated with a respective mobile ID, wherein the one or more groups are each associated with one or more shared services that are accessible to each member of a corresponding group based on information related to the mobile ID associated with the respective member.

Some implementations described herein relate to a non-transitory computer-readable medium that stores a set of instructions. The set of instructions, when executed by one or more processors of a mobile device, may cause the mobile device to store information related to a mobile ID registered to the mobile device, wherein the mobile ID is an electronic identity document associated with a user of the mobile device. The set of instructions, when executed by one or more processors of the mobile device, may cause the mobile device to configure, for the mobile ID, a mobile ID association tree that defines one or more groups that each include, as members, the user of the mobile device and one or more additional users that are each associated with a respective mobile ID, wherein the one or more groups are each associated with one or more shared services that are accessible to each member of a corresponding group based on information related to the mobile ID associated with the respective member. The set of instructions, when executed by one or more processors of the mobile device, may cause the mobile device to display a user interface that includes one or more elements to manage the users that are included in the one or more groups and the one or more shared services that are accessible to the members of the one or more groups.

BRIEF DESCRIPTION OF THE DRAWINGS

FIGS. 1A-1G are diagrams of an example implementation associated with a mobile ID association tree for connecting shared services, in accordance with some embodiments of the present disclosure.

DETAILED DESCRIPTION

Figure 1B:
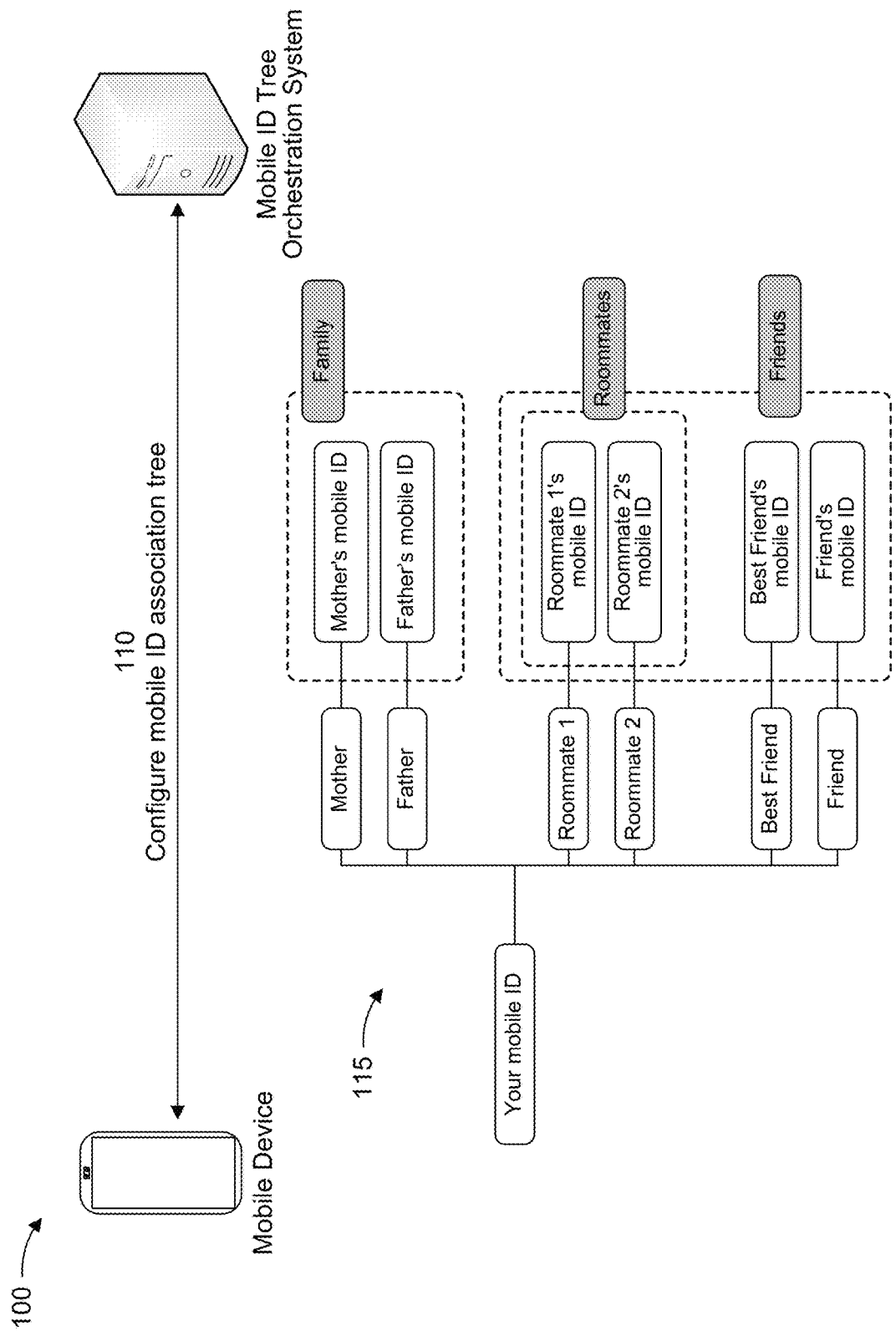

The following detailed description of example implementations refers to the accompanying drawings. The same reference numbers in different drawings may identify the same or similar elements.

There are many services that provide opportunities for people to share access to resources or information, collaborate, communicate, or otherwise connect with other people in different contexts and/or for various purposes. For example, a car insurance policy can cover multiple drivers, including family members or friends who are listed as authorized drivers on the policy. In another example, a home automation system can be shared by multiple members of a household to control various smart home functions (e.g., lighting, temperature, and/or security) via smart thermostats, smart locks, and/or other connected devices. In still other examples, streaming services can be shared by multiple users with different profiles, which allows each user to have their own personalized recommendations and watch history; family cell phone plans allow multiple people to share a single account and bill, often with discounts for additional lines; and joint bank or credit accounts can be shared by multiple people, such as spouses or family members who want to manage finances together or otherwise share access to financial resources.

Although shared services can provide convenience and cost savings for friends, family members, households, or other groups of users who want to share access to resources and/or information, current techniques for connecting multiple users to a shared service are typically handled in isolation, where the group of users authorized to access a shared service has to be configured individually for each shared (or sharable) service. For example, in order to connect multiple users to a smart home or home automation system, one or more authorized users may need to access an application or website associated with the home automation system and follow a workflow to configure the users that are to be granted access to the home automation system. Furthermore, users may have to perform separate management workflows to connect a group of users to services associated with sharing information (e.g., medical information such as prescriptions), insurance benefits (e.g., health insurance, dental insurance, and/or car insurance policies), cloud computing services (e.g., allowing multiple users to access documents, photos, files, or other information hosted in a cloud computing environment), and/or consumer benefits (e.g., friend and family discounts, rewards, and/or loyalty program benefits), among other examples.

Accordingly, existing techniques to connect or otherwise integrate groups of users with different shared services are inefficient and resource-intensive, because users have to perform separate management workflows to configure the users that have access to each shared service. Furthermore, configuring the users that have access to each shared service individually may present security risks, because there are more potential vectors that a malicious user could exploit to gain unauthorized access to a shared service.

Some implementations described herein relate to techniques to connect or otherwise configure access to one or more shared services using a mobile ID association tree that uses mobile IDs to establish a trusted network of various users and/or groups of users that may have different authorization levels for one or more shared services and/or access to different shared services. For example, in some implementations, a mobile device may be provisioned with a mobile ID by a mobile ID verifier system (e.g., a system associated with an entity that enrolls and verifies the identity of a user requesting the mobile ID), and the mobile ID may be stored by the mobile device and accessed via a mobile application (e.g., a digital wallet application). In some implementations, the mobile ID that is stored by and registered to the mobile device can then be leveraged to build a mobile ID association tree that can be used to control access that different users (or groups of users) have to one or more shared services. For example, in some implementations, the mobile device may communicate with a mobile ID tree orchestration system to configure a mobile ID association tree that defines one or more user groups (e.g., family, friends, and/or roommates), where each user that is represented in the mobile ID association tree may be a holder of a mobile ID that is registered to a mobile device associated with the user. The one or more user groups can then be used to establish integrations with different shared or sharable services. For example, each group in the mobile ID association tree may be associated with one or more shared services that are accessible to each member of a corresponding group. In this way, the mobile ID association tree may provide a mechanism to connect users to shared services in a verified and configurable and centralized manner (e.g., a user may be added to a user group authorized to access a set of shared services, which may grant the user access to all of the shared services associated with the user group). Furthermore, the mobile IDs that are registered to the mobile devices are subject to robust identity verification, and can therefore provide a secure electronic identity document that can be used to verify the identity of a person requesting access to a shared service.

FIGS. 1A-1G are diagrams of an example 100 associated with a mobile ID association tree for connecting shared services. As shown in FIGS. 1A-1G, example 100 includes a mobile device, a mobile ID issuer system, a mobile ID tree orchestration system, a service provider system, a kiosk device, and a mobile ID verifier system. The mobile device, mobile ID issuer system, mobile ID tree orchestration system, service provider system, kiosk device, and mobile ID verifier system are described in more detail in connection with FIG. 2 and FIG. 3.

As described herein, a mobile ID is an electronic identity document, which may be a counterpart to a physical identity document (e.g., a driver's license, a non-driver identification card, or a child identification card) or a standalone (e.g., digital-only) identity document issued by an entity that verify an identity (e.g., a state department of motor vehicles (DMV), an agency that issues passports, a bank, a mobile network operator, or any other suitable entity that can verify a personal identity and/or a user identity). For example, in the United States, states are the primary issuing authorities for driver's licenses, non-driver identification cards, and child ID cards, and typically verify an identity of a person applying for a driver's license or a non-driver identification card through an identity proofing process in which various documents related to citizenship, residency, and biographic data (e.g., birth certificates, social security cards, utility bills, lease or mortgage documents, passports, or the like) are received, reviewed, verified, and authenticated. In cases where the person applying for the driver's license, non-driver identification card, or other identity document satisfies all applicable conditions, the state DMV or other suitable agency then issues a physical identity document directly to the person. The physical identity document then allows other entities to verify the identity of the individual and/or verify biographical information associated with the individual (e.g., age or residence). Furthermore, various other entities may manage processes to verify personal and/or user entities (e.g., banks, universities, employers, service providers, and/or other entities may verify a personal and/or user identity based on documentation or other information provided by a person and/or user).

Accordingly, because an applicant for a physical and/or electronic identity document has to satisfy a robust identity verification process, there is near-universal acceptance of identity documents such as driver's licenses, non-driver identification cards, child ID cards, or the like as a valid ID. As described herein, a mobile ID is a secure, accurate, and interoperable digital or electronic representation of the information associated with an identity document and/or information relevant to state privileges, national context, international or global identification (e.g., digital passports), and/or other identification contexts (e.g., school IDs or employment IDs), which is generally provisioned onto a smart mobile device, such as a smartphone, a tablet, or a smart watch, for use by the proper holder of the mobile ID. For example, in some implementations described herein, a holder of a mobile ID may correspond to a user of the mobile device, and may refer to the legitimate owner of an identity associated with a digital-only mobile ID or a mobile ID that is a counterpart to a physical identity document. Additionally, or alternatively, the holder of a mobile ID may be a parent, guardian, agent, or other person empowered to represent or otherwise act on behalf of the legitimate owner of the identity associated with the mobile ID. Furthermore, the mobile ID issuer system may correspond to an issuing authority or other suitable entity (e.g., a state DMV, financial institution, educational institution, private enterprise, or the like) that enrolls and verifies the identity of the holder of the mobile ID and provisions the mobile ID onto the mobile device, the mobile ID verifier system may correspond to a relying entity (e.g., law enforcement, airports, air carriers, age verifiers, identity verifiers, driving privilege verifiers, financial institutions, or the like) that requires a person to provide proof of an identity or verified biographical information in order to provide a product, service, or entitlement to a holder of a mobile ID, and the mobile ID orchestration system may correspond to a service provider that manages the use of mobile IDs in connection with one or more mobile ID association trees that can be used to connect groups of users to one or more sets of shared services.

In some implementations, as described herein, the holder of a mobile ID (e.g., the user of the mobile device) may generally access, or allow access to, information associated with the mobile ID through a mobile application (e.g., an application container or digital wallet) approved by the mobile ID issuer system. The mobile application may allow the user of the mobile device to determine whether, to whom, and what information associated with the mobile ID is to be shared during a particular interaction. For example, to purchase alcohol or other age-restricted products, the mobile device may communicate only information that indicates or otherwise relates to an age of the user of the mobile device, and all other information may remain private. The entity that needs to confirm the identity or biographical information associated with the mobile ID stored on the mobile device (e.g., an entity associated with the mobile ID verifier system) may receive information associated with the mobile ID that has been authorized for sharing through an electronic reader (e.g., in an attended transaction) or over a network (e.g., in an unattended transaction) and confirm the authenticity of the mobile ID and the shared information associated with the mobile ID. In some implementations, the mobile ID stored on the mobile device may be associated with the user of the mobile device, or the user of the mobile device may be a parent, guardian, agent, or other person that represents or acts on behalf of the person associated with the mobile ID stored on the mobile device (e.g., a mobile ID for a child may be stored on a parent's or guardian's mobile device, as many children do not have their own mobile device). For example, the mobile ID may embed all relevant data associated with the electronic identity document into individual data fields, which allows the data to be compartmentalized such that the user of the mobile device can share only one or more fields that the user wishes to share or that the mobile ID verifier system requires to be provided. The individual data elements are digitally signed by the mobile ID issuer system (e.g., using a private key associated with the mobile ID issuer system), and the mobile ID verifier system has capabilities to verify the cryptographic signature(s) of the shared data fields such that the mobile ID verifier system can have confidence in the authenticity of the shared data field(s).

Accordingly, because a mobile ID as described herein is an electronic companion or counterpart to a physical identity document or a standalone (e.g., digital-only) identity document, individuals generally have to provide evidence or proof of identity and other biographical information prior to being eligible for a mobile ID. After the appropriate entity (e.g., DMV, passport agency, financial institution, educational institution, or the like) has verified the identity and established a record of the applicant in their system, the applicant can then obtain a mobile ID through a suitable process that is established by the issuing (identity-verifying) entity. In some implementations, the specific process may vary from one entity to another (e.g., self-guided biometric registration, notarized provisioning, remote video proofing, and/or in-person activation), but may generally comply with the International Organization for Standardization and the International Electrotechnical Commission (ISO/IEC) draft standard 18013-5, which sets forth informative guidance for issuing authorities to design and implement mobile ID solutions for privacy and security. In particular, as described herein, the mobile ID issuer system may implement a process to verify that the user of the mobile device is the owner of the identity associated with the mobile ID being requested and the owner of the mobile device to be provisioned with the mobile ID. For example, in some implementations, the mobile ID issuer system may verify whether the user of the mobile device owns the identity associated with the mobile ID being requested and the mobile device to be provisioned with the mobile ID based on payment records, a personal identification number (PIN) or other shared secret, facial recognition matched against a trusted data source, or in-person registration of the mobile device.

For example, FIG. 1A illustrates an example process that the mobile ID issuer system may implement to verify whether the user of the mobile device owns the identity associated with the mobile ID being requested and the mobile device to be provisioned with the mobile ID. In some implementations, the user of the mobile device may open a mobile application (e.g., an application container or digital wallet) that can be used to store and manage a mobile ID, and may select an option to request a mobile ID from the mobile ID issuer system. In this example, as shown by reference number 102, the mobile application may prompt the user to capture one or more images of a physical identity document, such as a front image and a back image of a state-issued driver's license or non-driver identification card. The user may then position the physical identify document in a frame displayed on a screen of the mobile device, which is equipped with a camera that captures the requested image(s). As further shown by reference number 104, the mobile application may then prompt the user to capture one or more images that prove the identity of the user of the mobile device. For example, the mobile application may prompt the user to capture an image of the user's face (e.g., via a front-facing camera) or may prompt the user to provide other information proving the identity of the user, such as a fingerprint or other biometric (e.g., to validate that the person owning the physical identity document, rather than an identity thief, is requesting the mobile ID).

In some implementations, as shown by reference number 106, the mobile device may then send a request for the mobile ID to the mobile ID issuer system, where the request may include the image(s) of the physical identity document and the image(s) or other proof of identity associated with the user of the mobile device. In some implementations, the mobile ID issuer system may then provision the mobile ID to the mobile device (e.g., causing the mobile device to store the mobile ID, a digital token, or other suitable information) based on verifying the authenticity of the physical identity document based on the image(s) included in the request and that the image or other proof of identity matches the person associated with the physical identity document. Additionally, or alternatively, in some cases, the mobile ID issuer system may require further verification to finalize the process of provisioning the mobile ID (e.g., where the image of the user does not clearly match the photograph on the physical identity document). For example, in some implementations, the mobile ID issuer system may provide the mobile device with instructions for verifying the authenticity of the physical identity document and/or the identity of the user using an online portal (e.g., associated with a state DMV or other suitable entity that issues mobile IDs) or through in-person registration. In another example, the mobile ID issuer system may generate a confirmation code that is sent in a letter to the mailing address on the physical identity document, and the identity of the user may be verified based on the user providing, via the mobile application on the mobile device, the confirmation code to the mobile ID issuer system.

Accordingly, as described herein, the user of the mobile device may employ the process shown in FIG. 1A, or any other suitable process that satisfies applicable requirements related to trust, security, and identity verification to request and register a mobile ID to the mobile device. In some implementations, the mobile ID may have a one-to-one relationship to the mobile device. Alternatively, in some implementations, the mobile ID issuer system may permit the mobile ID to be stored on more than one mobile device. For example, the mobile ID issuer system may permit the mobile ID to be stored on the mobile device and one peripheral paired with the mobile device (e.g., a smartphone and a smart watch paired with the smartphone) or on multiple mobile devices associated with the user (e.g., a personal mobile device, a work mobile device, and/or a tablet, among other examples).

In some implementations, after the user of the mobile device has obtained the mobile ID that is a standalone electronic identity document or an electronic counterpart to a physical identity document owned by the user, the user may then use the mobile ID to establish a mobile ID association tree that defines one or more groups of people associated with the user in order to connect groups of people with one or more sets of shared services. For example, as shown in FIG. 1B, the mobile device may communicate with the mobile ID tree orchestration system to configure, for the mobile ID, a mobile ID association tree that defines one or more groups of users, each of which may include the user of the mobile device and one or more additional users that are each associated with a respective mobile ID. Furthermore, each individual user may be a member of one or more distinct groups and/or sub-groups (e.g., a user may be included in a friends group and a roommates group, or a friends group and a co-workers group). For example, there may be a partial overlap between or among different groups or sub-groups, where one or more users may be a member of multiple groups or sub-groups, and each group or sub-group may include one or more members that are not members of other groups or sub-groups. Accordingly, as described herein, the mobile ID associated with various users may be used to establish a trusted network including one or more groups and/or sub-groups of users that have a relationship with the user of the mobile device. For example, in some implementations, the mobile ID tree orchestration system may coordinate a mutual verification process to confirm a relationship between a user of the mobile device and another user. For example, the user of the mobile device may send a request to the mobile ID tree association system to configure a relationship between the user and another user associated with a different mobile ID, and the mobile ID orchestration system may send a message to the mobile device associated with the mobile ID of the other user to confirm the relationship. In another example, a user that is an organizer of one or more groups or sub-groups may send a request to the mobile ID tree association system to invite another user to join a group or sub-group in the mobile ID association tree associated with the user (e.g., a parent may invite a child to join a family group organized by the parent). In this way, associations between different users may be defined and verified through the mobile ID registered to each user, which may define a two-way verified association between each pair of users. Accordingly, in some implementations, the mobile ID association tree may be configured for the mobile ID associated with the user of the mobile device by providing the user with the option to organize different users into groups or by the mobile ID tree orchestration system deriving the groups based on the two-way verified association facilitated through the mobile ID tree orchestration system.

For example, reference number 115 depicts an example mobile ID association tree that includes various groups for friends and family members associated with the user of the mobile device. As shown, the mobile ID associated with the user of the mobile device is at a root of the mobile ID association tree configured for the mobile ID associated with the mobile device, whereby all other associations in the mobile ID association tree are relative to the user of the mobile device. Furthermore, as shown, each user (or person) represented in the mobile ID association tree is associated with a respective mobile ID that the user registered to their mobile device using a suitable process defined by the applicable mobile ID issuer system (e.g., users that reside in different states may follow different procedures to request and obtain their mobile IDs). As further shown, the various users may be organized into groups based on their relationships with the user of the mobile device. Furthermore, one or more groups may include one or more sub-groups, to allow the user of the mobile device to define the groups at varying levels of granularity. For example, the mobile ID association tree shown by reference number 115 includes a family group that includes the user's mother and father, a friends group that includes the user's best friend and another friend, and a roommates sub-group within the friend group that includes two roommates of the user. In other examples, the user may create groups to represent siblings or parents (e.g., as a sub-group of the family group), colleagues, acquaintances, people that the user dislikes (e.g., frenemies), a hobby group, or any other suitable descriptor. Furthermore, in cases where the associations between users are mutual, mobile ID association trees associated with different users may reflect the mutual relationships. For example, the user of the mobile device may be included in a children group in the mobile ID association tree(s) associated with the parent(s) of the user of the mobile device. Additionally, or alternatively, a first user may be added to a group or sub-group in the mobile ID association tree of a second user without the first user being explicitly aware of the membership in the group or sub-group in the mobile ID association tree of a second user. For example, after a first user has consented to or otherwise authorized sharing information related to a mobile ID with a second user, the second user may unilaterally add the first user to one or more groups or sub-groups without explicitly disclosing that to the first user (e.g., the second user may not want members of a frenemies group to be aware that they were added to the frenemies group, analogous to adding a user to a blocked list on a social media platform). In some implementations, the various groups of users that are defined in the mobile ID association tree can then be used to configure various integrations to control access, or a level of access, that users in the various groups have to one or more sets of shared services.

Figure 1C:
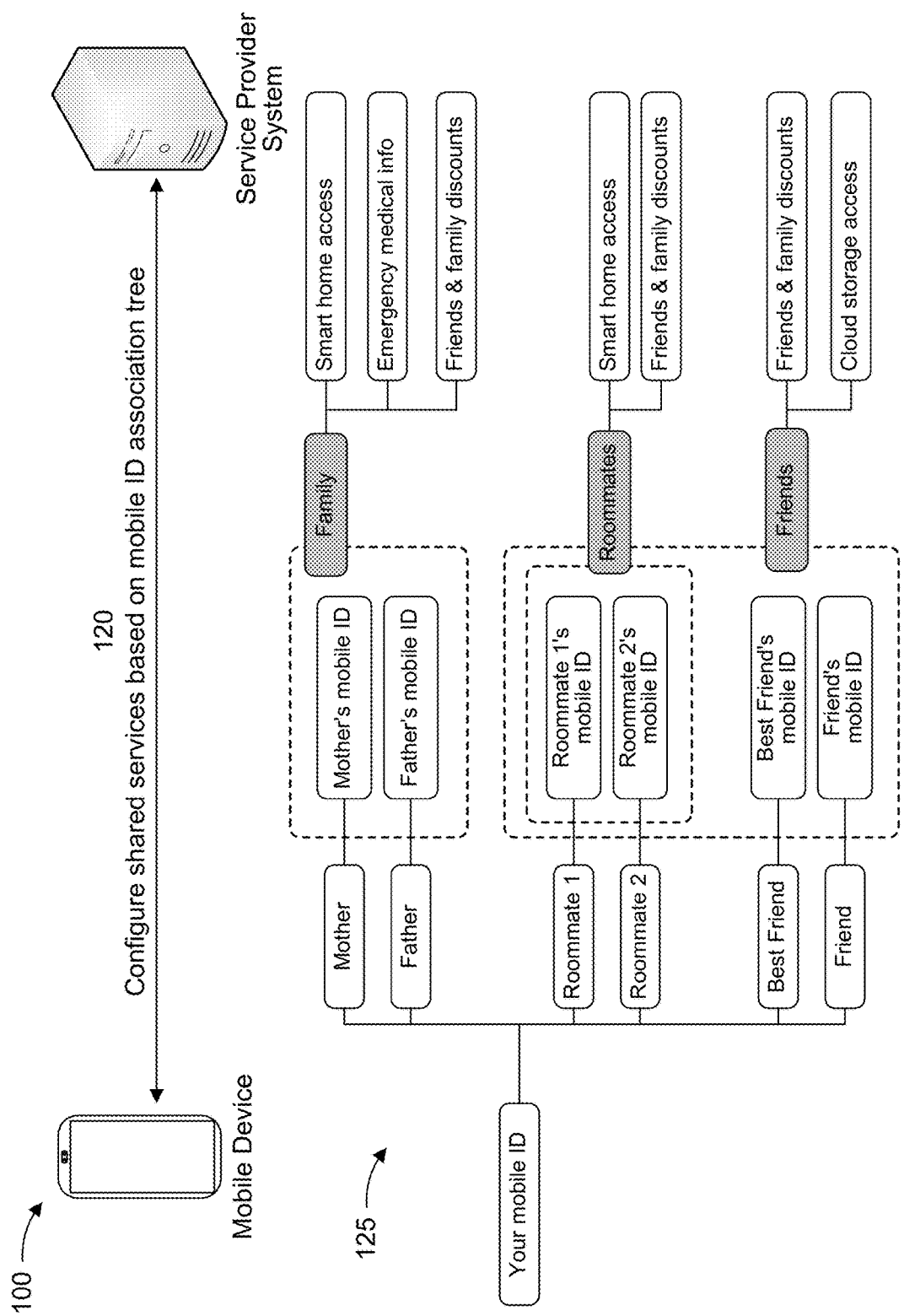

For example, as shown in FIG. 1C, and by reference number 120, the mobile device may communicate with one or more service provider systems to configure the access, or the level of access, that users in the various groups have to one or more sets of shared services. For example, in some implementations, the service provider systems may be associated with services that permit or otherwise enable sharing with multiple users or people, and the mobile device may provide an interface that enables the user of the mobile device to interact with the service provider systems to configure associations between shared services and the groups defined in the mobile ID association tree. For example, the interface provided by the mobile device may be associated with an application for configuring and/or managing the mobile ID association tree, and may provide the user with options for adding, removing, viewing, configuring, and/or otherwise managing the shared services and the groups of users that have access to the shared services (e.g., as described in further detail below with reference to FIG. 1F and FIG. 1G).

Accordingly, as described herein, the mobile device may communicate with a service provider system to configure one or more groups of users that are authorized to access a shared service that is controlled or otherwise managed by the service provider system based on information related to the mobile ID associated with each member of a group that is authorized to access the shared service. Additionally, or alternatively, other users in the mobile ID association tree may communicate with the service provider system to configure the groups of users that are authorized to access a shared service. For example, in some implementations, the service provider system may allow one or more users to be designated organizer users (or administrators or managers) that are authorized to add, remove, or modify the associations among the groups of users that are permitted to access a shared service. Accordingly, in cases where the user of the mobile device is requesting access to a particular shared service and the user is not the organizer user for that shared service, the mobile device may send (e.g., via the service provider system or the mobile ID orchestration system) a request to add the user of the mobile device to the group that has access to the shared service, and the user may be added to the group based on the organizer user approving the request. Additionally, or alternatively, in cases where the user of the mobile device is the organizer user for a shared service, the mobile device associated with the user may receive, from a mobile device of another user, a request to add the user to a group that has access to the shared service, and the other user may be added to the group and therefore granted access to the shared service based on the user approving the request. Additionally, or alternatively, a user that is an organizer for a shared service may independently add users or groups of users to a shared service, in which case the service provider system and/or the mobile ID orchestration system may send, to the mobile device, a notification that is displayed on the mobile device to indicate that the user has been added to a group or otherwise granted access to the shared service. Additionally, or alternatively, a user that is an organizer for one or more groups or sub-groups may invite other users to join the group(s) or sub-group(s), in which case the service provider system and/or the mobile ID orchestration system may send, to the mobile device of the invited user, a notification or message that provides the invited user with an option to join the appropriate group(s) or sub-group(s).

In general, as described herein, the particular workflows that users follow to configure integrations that define which group(s) are permitted to access which shared service(s) may vary depending on the provider of the shared service. Furthermore, in some implementations, there are many different shared services that can be connected to user groups via the mobile ID association tree. For example, in FIG. 1C, reference number 125 depicts an example in which each member of the family group has access to smart home functionality, emergency medical information, and friends and family discounts. Furthermore, as shown, each member of the friends group has access to friends and family discounts and cloud storage access, and members of the roommates sub-group also have access to smart home functionality. In some implementations, each user that is a member of a group that has access to a particular shared service can then use the mobile ID registered to their mobile device to access the shared service.

For example, in order to use the mobile ID registered to the mobile device in a transaction or interaction to request access to a shared service, the mobile device may be presented to a mobile ID verifier system that then obtains information associated with the mobile ID registered to the mobile device. For example, the mobile device may be presented in an offline/transmit use case, where the mobile ID is securely stored on the mobile device and the mobile ID verifier system includes a kiosk device or is otherwise equipped to read the mobile ID from the mobile device. In this case, the mobile ID verifier system and/or kiosk device does not necessarily need to be connected or in an online state. For example, the mobile ID verifier system may request that the user of the mobile device transmit identity attributes over communication channels supported by the mobile device and the mobile ID verifier system, and the requested identity attributes associated with the mobile ID may be transmitted from the mobile device to the mobile ID verifier system over a secure encrypted channel along with a cryptographic signature from the mobile ID issuer system to prove that the data has not been altered (e.g., via a tap and an exchange of parameters over near field communication (NFC) and/or a scan and an optical exchange of connection parameters implemented by the mobile ID verifier system based on decoding a quick response (QR) code presented by the mobile device). The reader can then check that the mobile ID was transmitted by the mobile device to which the mobile ID was originally provisioned (e.g., using certificates to verify data from any suitable mobile ID issuer system that the mobile ID verification system expects to encounter, which may be periodically downloaded or otherwise obtained from the mobile ID issuer system rather than being maintained via a real-time always-on connection). Additionally, or alternatively, the information associated with the mobile ID may be communicated to the mobile ID verifier system in an online/token use case, where the mobile device sends a token to a connected (e.g., online) kiosk device and/or mobile ID verifier system, where the token authorizes the kiosk device and/or mobile ID verifier system to request and receive specific and signed identity data from an online source (e.g., the mobile ID issuer system). In this case, mechanisms that the verifier system uses to obtain the information associated with the mobile ID may include a RESTful web application program interface (API), an OpenID Connect (OIDC) interface, or another suitable interface.

In this way, the mobile ID association tree can leverage mobile IDs (or certain attributes associated with mobile IDs) to configure access to various shared services. For example, in a home automation use case, each user that is in a group that has access to smart home functionality may present their mobile ID to a smart lock or other system that acts as the mobile ID verifier system to electronically open a door based on the user being a member of a group of users that has access to the smart home. For example, the mobile ID association tree may be configured such that residents of the smart home can use their mobile ID to electronically open a door. In other examples, user groups may be created or modified dynamically to grant or revoke access to the smart home. Furthermore, in some implementations, a user's membership in a group or sub-group and/or authorization to access a particular service may be associated with an expiration or other limitation (e.g., a date and/or time after which the user's membership in a group or sub-group expires or access to authorize a service is no longer valid). For example, a contractor, a short-term rental guest, and/or a realtor can be added to a group of users that has access to the smart home on a temporary basis. In another example, a user that is an insured party or policyholder on a car insurance policy may add their spouse and driving-age children to the car insurance policy, which may then be linked to the mobile ID registered to each user's mobile device. In another example, authorized users may be added to a smart car service, whereby a user that is a member of a group having access to the smart car service may present their mobile ID to the smart car, which may be unlocked based on verifying that the user is authorized to access the smart car and electronically started based on verifying that the user's driving privileges and car insurance are in good standing based on the mobile ID. Furthermore, other potential use cases for sharing services based on the mobile ID include adding or removing individuals that are authorized to pick children up from school or daycare, sharing friends and family discounts, sharing access to concert tickets or other events, sharing frequent flier information for group bookings (e.g., family, school, and/or work trips), connecting digital platforms (e.g., media streaming services, gaming services, and/or shared wish lists), sharing emergency medical information (e.g., blood types, medications, allergies), sharing medical registrations (e.g., for medical, dental, and vision plans and/or urgent care registrations), mitigating fraud in peer-to-peer payment networks, sharing financial accounts (e.g., for making credit card purchases, automated teller machine (ATM) withdrawals, and/or setting spending limits), and/or sharing and showing registered family associations (e.g., for locating lost children), among other examples.

Figure 1D:
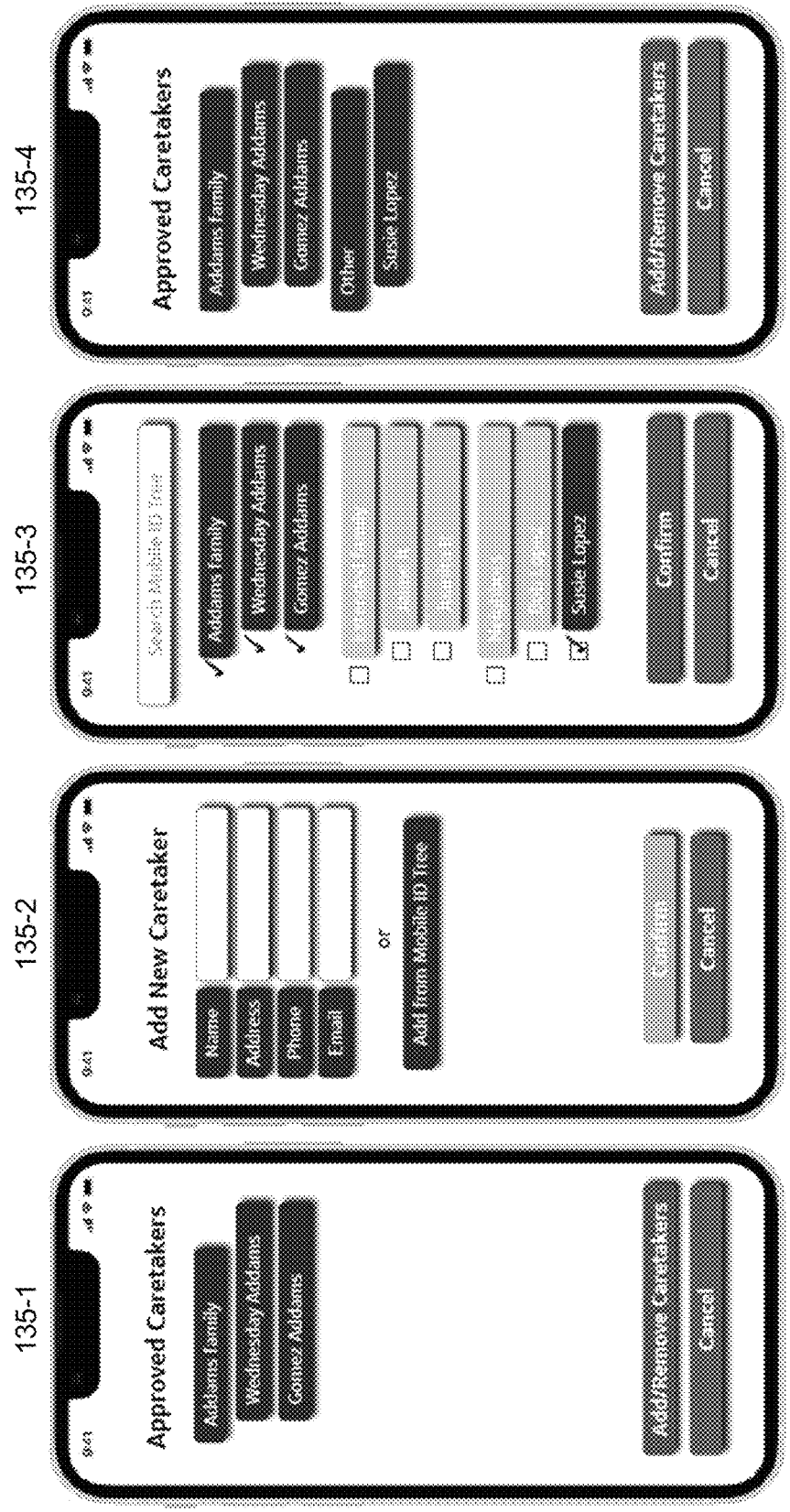

Referring to FIG. 1D, reference number 130 depicts an example workflow in which the mobile ID association tree can be used to add an approved caretaker that is authorized to pick a child up from school or daycare. However, it will be appreciated that the workflow depicted in FIG. 1D may be extended to add, remove, or otherwise configure authorized users, authorized user groups, varying access levels, or the like for any suitable shared service that is integrated with the mobile ID association tree. As shown in FIG. 1D, and by reference number 135-1, the user of the mobile device may access an application associated with the mobile ID association tree via the mobile device, which may display an interface to view and configure (e.g., add or remove) approved caretakers that are authorized to pick a child up from school or daycare. For example, as shown by reference number 135-1, the interface may display a description of the group of users that are in the list of approved caretakers, and may further display the names or other suitable information to identify the member(s) of the group of users that are in the list of approved caretakers. Furthermore, as shown, the interface includes an option to add or remove approved caretakers. In some implementations, reference number 135-2 depicts an interface that may be displayed by the mobile device based on the user selecting the option to add an approved caretaker. For example, the interface depicted by reference number 135-2 includes various fields to manually enter biographical details of the new caretaker, and an option to add the new caretaker from a mobile ID association tree associated with the user of the mobile device.

Accordingly, reference number 135-3 depicts an interface that may be displayed on the mobile device based on the user selecting the option to add the new caretaker from the mobile ID association tree associated with the user of the mobile device. As shown, the interface may include one or more selectable elements (e.g., checkboxes) associated with one or more users and/or one or more groups of users, whereby the user may select the user(s) or group(s) of users to be added as approved caretakers. For example, the user may select a group of users in order to add every member of the group as an approved caretaker, or may select one or more individual users to be added as approved caretakers (e.g., in the illustrated example, the user has selected "Susie Lopez," who is a member of the Neighbors group, or the user could have selected the "Neighbors" checkbox to add Susie Lopez and Bob Lopez to the list of approved caretakers). In some implementations, after the user has indicated the user(s) or group(s) of users to be added as approved caretakers, the mobile device may communicate with a service provider associated with the daycare or school where the child is to be picked up (e.g., such that the mobile ID verifier system provided at the daycare or school can verify that a person claiming to be authorized to pick up the child is actually authorized to do so). In some implementations, the user may be required to provide suitable credentials or permissions (e.g., login information or proof of identity) to configure the change in the user(s) or group(s) of users that are authorized for the shared service (e.g., daycare pickup). Reference number 135-4 depicts an example interface that may be displayed after the user has added the new caretaker and performed any other steps that are needed to add the approved caretaker, where the new caretaker added from the mobile ID association tree is now shown among the list of approved caretakers. Furthermore, as described herein, the membership in the group of approved caretakers (or any other group or sub-group) may be associated with an expiration (e.g., a person may be added to the members of a group or sub-group and granted certain access or permissions only on a particular day, for a particular time window, or the like), in which case the membership in the group of approved caretakers may expire when one or more conditions associated with the expiration are satisfied.

Figure 1E:
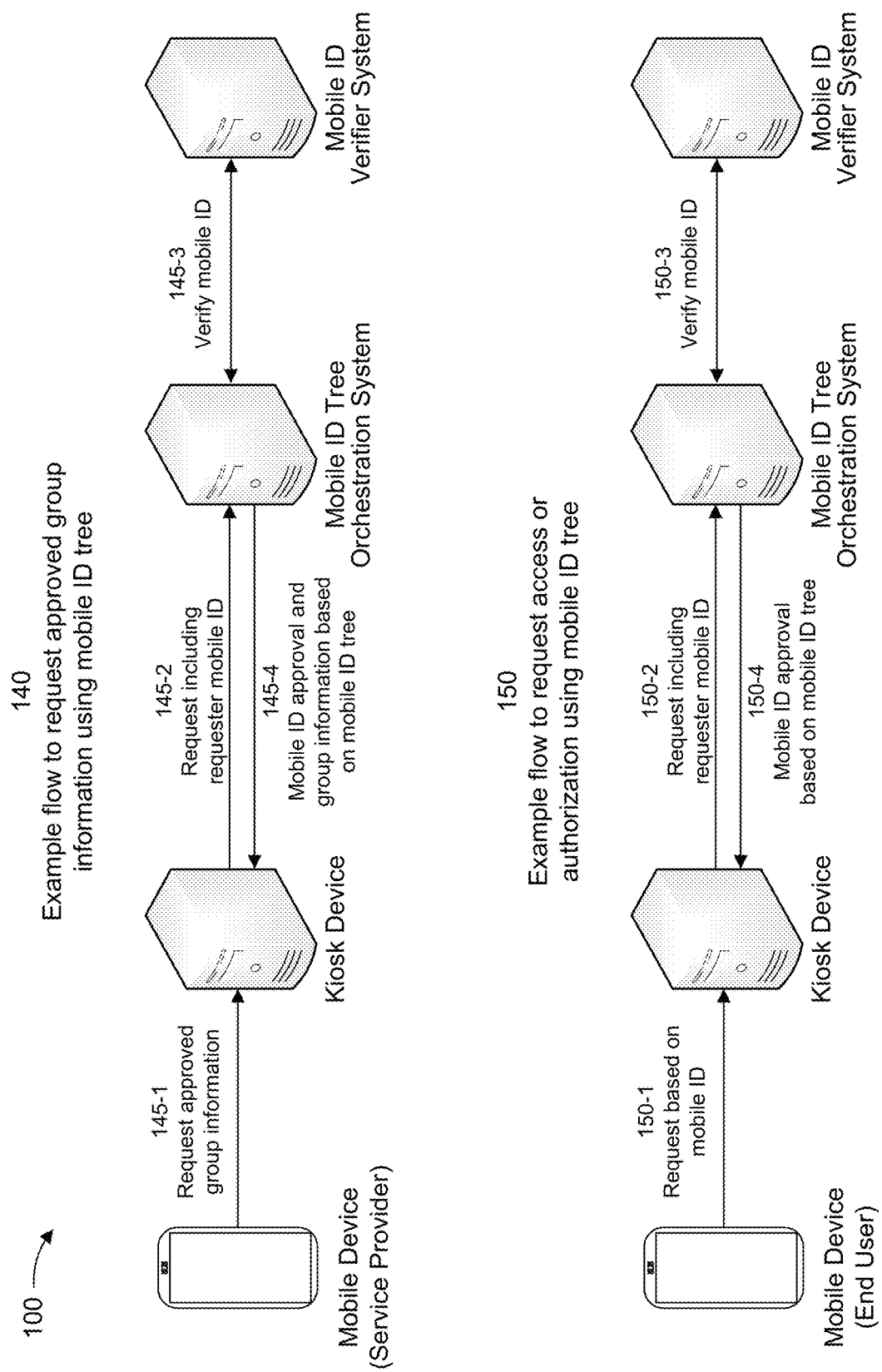

Referring to FIG. 1E, reference numbers 140 and 150 depict example flows to use the information in the mobile ID association tree to configure access to a service based on information contained in one or more mobile IDs. For example, in the context of the daycare or school pickup described above, the kiosk device may be an electronic device equipped with capabilities to read a mobile ID to verify that a person picking a child up from daycare or school is in a list of approved caretakers. In particular, reference number 140 depicts a first flow that may be performed by a service provider (e.g., the daycare or school) to configure the kiosk device with a set of authorized users (e.g., people who are authorized to pick a child up from daycare or school), and reference number 150 depicts a second flow that may be performed by a person who is attempting to prove that the user is authorized for a particular service (e.g., picking the child up from school). For example, as shown by reference number 145-1, a user associated with the service provider (e.g., a teacher or other authorized person at the daycare or school) may present their mobile device to the kiosk device (e.g., using the offline/transmit mechanism or the online/token mechanism described elsewhere herein). For example, the user may present their mobile device to the kiosk device to request an update to the list of users that are authorized for a particular service (e.g., daycare or school pickup). The kiosk device may then read one or more data elements from the mobile ID stored on the mobile device, such as information identifying the user associated with the service provider. As shown by reference number 145-2, the kiosk device may send a request for the updated group or user information to the mobile ID tree orchestration system, which may send the mobile ID to a mobile ID verifier system that may verify the authenticity of the information that is shared by the holder of the mobile ID, as shown by reference number 145-3. In some implementations, as shown by reference number 145-4, the mobile ID tree orchestration system may then retrieve the authorized group information (e.g., from a data repository that includes representations of the mobile ID association trees for various users) and send the authorized group information to the kiosk device based on the mobile ID verifier system indicating that the mobile ID is authentic.

As further shown in FIG. 1E, and by reference number 150-1, a person attempting to prove that they are authorized for the service (e.g., a person picking a child up from the daycare or school) may present their mobile device to the kiosk device to request access (e.g., to a restricted area where children stay until their authorized caretaker arrives). In this case, the kiosk device reads information associated with the mobile ID of the person attempting to prove that they are authorized for the service from the mobile device, and sends a request that includes the requester's mobile ID to the mobile ID tree orchestration system 150-2. For example, the request may include the name or other identity information associated with the person requesting access to the service. In some implementations, as shown by reference number 150-3, the mobile ID tree orchestration system may send a request to the mobile ID verifier system to verify the authenticity of the mobile ID. As shown by reference number 150-4, the mobile ID tree orchestration system may then send a mobile ID approval message to the kiosk device, thereby granting the user the requested access, based on the mobile ID verifier system indicating that the mobile ID is authentic and the applicable mobile ID association tree indicating that the user presenting the mobile ID is included among the users or groups of users that are authorized for the service. Alternatively, the mobile ID tree orchestration system may send a mobile ID rejection message to the kiosk device, thereby denying the user the requested access, based on the mobile ID verifier system indicating that the mobile ID is inauthentic and/or the applicable mobile ID association tree indicating that the user presenting the mobile ID is not included among the users or groups of users that are authorized for the service.

Figure 1F:
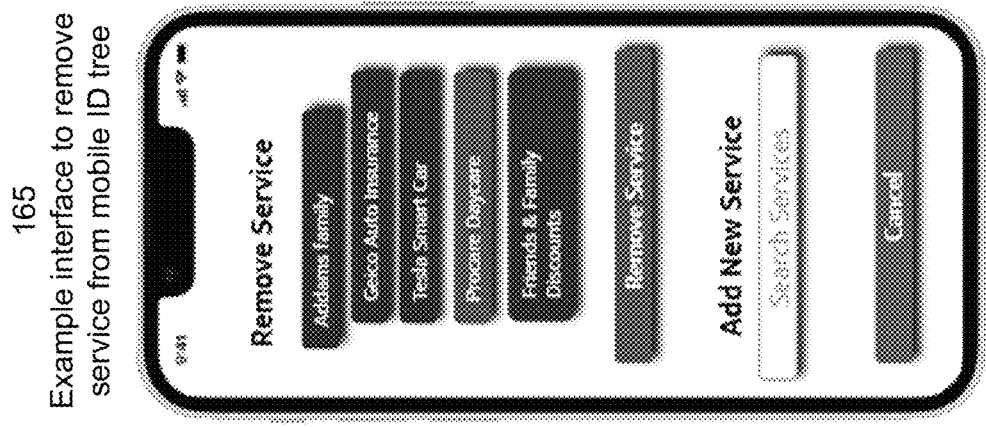
Figure 1F:
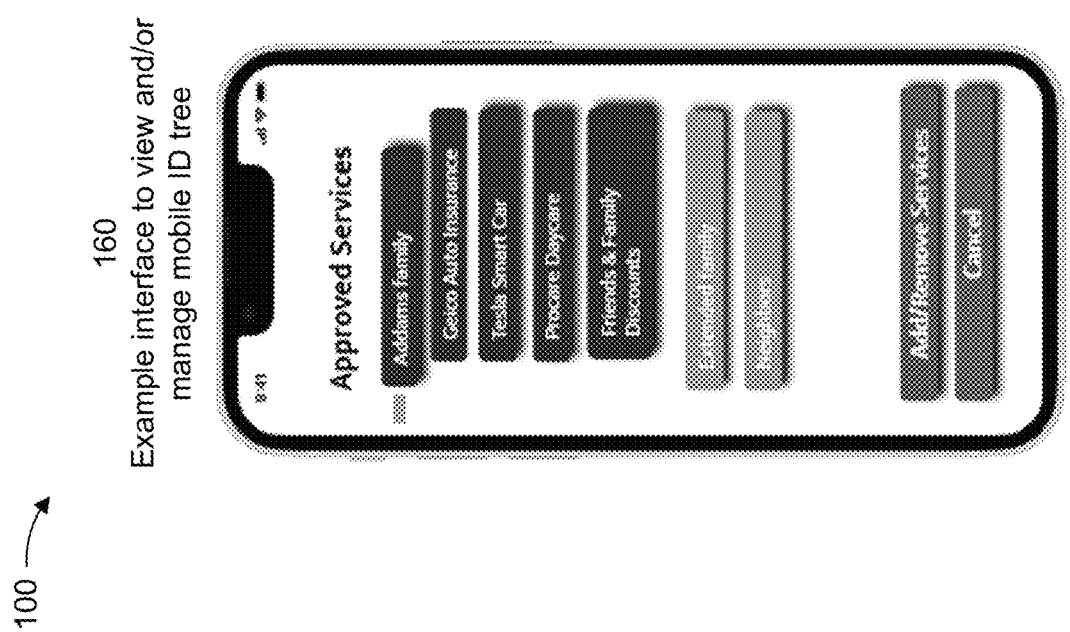

Referring to FIG. 1F, reference number 160 depicts an example interface that can be used to view and/or manage the mobile ID association tree associated with a user of a mobile device. For example, the interface may include a list of shared services that are managed using the mobile ID association tree, and may display the shared services that are associated with different groups of users. For example, as shown in FIG. 1F, the user is viewing a family group, whereby the interface displays all of the shared services that are accessible to members of the family group. Furthermore, the interface may include various elements that allow the user to expand different groups to show sets of shared services that are associated with each group, and the interface may include options to add or remove services from the mobile ID association tree. For example, in FIG. 1F, reference number 165 depicts an example interface that can be used to remove a shared service from the mobile ID association tree (e.g., based on the user selecting the option to add or remove services), where the user may select an existing service to remove. For example, in FIG. 1F, the user has selected a daycare service to be removed from the mobile ID association tree. Furthermore, the interface may provide a modal (e.g., a graphical control element) to confirm the removal.

Referring to FIG. 1G, reference number 170 depicts an example workflow that the user may follow to add a new shared service to the mobile ID association tree. For example, reference number 170-1 depicts an example interface that may be displayed based on the user selecting an option to add a shared service, where the interface may include an input box for searching for available services that can be configured via the mobile ID association tree and/or a list of one or more popular services or categories of services. In the illustrated example, the user has selected a smart home service, which then causes the mobile ID tree application to integrate with the smart home service. For example, in some implementations, the new service to be added to the mobile ID association tree may be associated with a service provider, and the mobile ID tree application may follow a push or pull workflow to integrate the service. For example, in a push workflow, the user may access an application, website, portal, or other interface associated with the service to be added (e.g., via a service provider system), and may provide credentials to access an account that the user holds with the service. The website, portal, or other interface associated with the service may then provide an option to integrate with the mobile ID association tree, whereby permissions or credentials to configure access to the service may then be pushed to the mobile ID tree application based on the user selecting the option to integrate with the mobile ID association tree. Additionally, or alternatively, in a pull workflow, the user may access the service to be added from within the mobile ID tree application, which may display an interface that allows the user to enter credentials that may result in the mobile ID tree application pulling the appropriate permissions or credentials to configure access to the service from the service provider. As shown in FIG. 1G, reference number 170-2 depicts an interface that may then be displayed to define the users and/or groups of users that are authorized to access the service. For example, the user may select a particular group to authorize all members of the group and/or may select one or more users individually. Furthermore, in some implementations, a modal may be provided to confirm the user(s) and/or group(s) of users to be authorized. As shown by reference number 170-3, an interface may then be displayed to show the newly configured service within the mobile ID association tree, whereby all users that are authorized to access the service may use their mobile ID to access the service using techniques described in more detail elsewhere herein.

As indicated above, FIGS. 1A-1G are provided as an example. Other examples may differ from what is described with regard to FIGS. 1A-1G.

Figure 2:
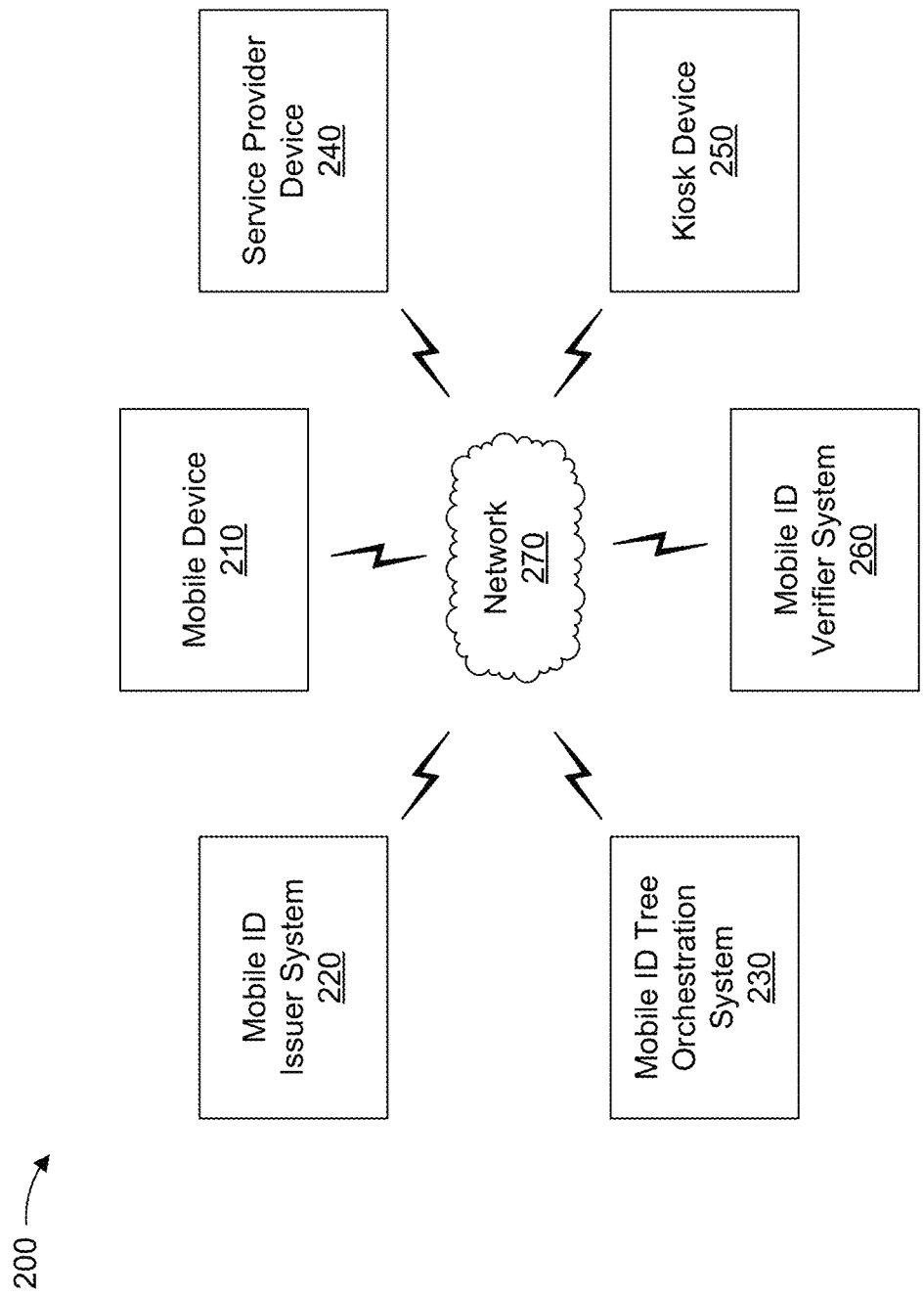
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a mobile device 210, a mobile ID issuer system 220, a mobile ID tree orchestration system 230, a service provider device 240, a kiosk device 250, a mobile ID verifier system 260, and/or a network 270. Devices of environment 200 may interconnect via wired connections, wireless connections, or a combination of wired and wireless connections.

The mobile device 210 may include one or more devices capable of storing a mobile ID. The mobile device 210 may include a communication device and/or a computing device. For example, the mobile device 210 may include a wireless communication device, a mobile phone, a user equipment, a tablet computer, a wearable communication device (e.g., a smart wristwatch, a pair of smart eyeglasses, a head mounted display, or a virtual reality headset), or a similar type of device. Additionally, or alternatively, the mobile device 210 may be capable of receiving, generating, storing, processing, and/or providing information associated with a mobile ID tree that can be used to connect shared services associated with different users, as described elsewhere herein.

The mobile ID issuer system 220 may include one or more devices capable of receiving, generating, storing, processing, providing, and/or routing information associated with a mobile ID association tree for connecting shared services, as described elsewhere herein. The mobile ID issuer system 220 may include a communication device and/or a computing device. For example, the mobile ID issuer system 220 may include a server, such as an application server, a client server, a web server, a database server, a host server, a proxy server, a virtual server (e.g., executing on computing hardware), or a server in a cloud computing system. In some implementations, the mobile ID issuer system 220 may include computing hardware used in a cloud computing environment.

The mobile ID tree orchestration system 230 may include one or more devices capable of receiving, generating, storing, processing, providing, and/or routing information associated with a mobile ID association tree for connecting shared services, as described elsewhere herein. The mobile ID tree orchestration system 230 may include a communication device and/or a computing device. For example, the mobile ID tree orchestration system 230 may include a server, such as an application server, a client server, a web server, a database server, a host server, a proxy server, a virtual server (e.g., executing on computing hardware), or a server in a cloud computing system. In some implementations, the mobile ID tree orchestration system 230 may include computing hardware used in a cloud computing environment.

The service provider device 240 may include one or more devices capable of receiving, generating, storing, processing, providing, and/or routing information associated with a mobile ID association tree for connecting shared services, as described elsewhere herein. The service provider device 240 may include a communication device and/or a computing device. For example, the service provider device 240 may include a server, such as an application server, a client server, a web server, a database server, a host server, a proxy server, a virtual server (e.g., executing on computing hardware), or a server in a cloud computing system. In some implementations, the service provider device 240 may include computing hardware used in a cloud computing environment.

The kiosk device 250 may include one or more devices capable of facilitating an electronic transaction associated with processing a request that relates to presentation of a mobile ID stored on the mobile device 210. For example, the kiosk device 250 may include a terminal or another suitable device equipped with capabilities to read, access, or otherwise obtain information associated with a mobile ID stored on the mobile device 210. In some implementations, the kiosk device 250 may include an access control terminal (e.g., used to control physical access to a secure area), such as an access control panel used to control an access-controlled entry (e.g., a turnstile, a door, a gate, or another physical barrier). The kiosk device 250 may include one or more input components and/or one or more output components to facilitate obtaining data associated with a mobile ID (e.g., a name, address, and/or date of birth) from the mobile device 210 and/or to facilitate interaction with and/or authorization from a person who is presenting the mobile ID stored on the mobile device 210. Example input components of the kiosk device 250 may include a number keypad, a touchscreen, a magnetic stripe reader, a chip reader, and/or a radio frequency (RF) signal reader (e.g., a near-field communication (NFC) reader). Example output devices of the kiosk device 250 may include a display and/or a speaker.

In some implementations, the mobile device 210 may store information associated with a mobile ID, which may be used in connection with an electronic access request or other suitable request facilitated by the kiosk device 250. The information associated with the mobile ID may include, for example, a name, an address, an age or date of birth, a photograph, and/or other suitable information that identifies a person associated with the mobile ID. In some implementations, the mobile device 210 may store the information associated with the mobile ID in a tamper-resistant memory of the mobile device 210, such as in a secure element. As part of performing an electronic interaction with the mobile ID (e.g., to convey information associated with the mobile ID), the mobile device 210 may transmit or otherwise communicate the information associated with the mobile ID to the kiosk device 250 using a communication component, such as a magnetic stripe, an integrated circuit (IC) chip, and/or a contactless communication component (e.g., an NFC component, an RF component, a Bluetooth component, and/or a Bluetooth Low Energy (BLE) component). Thus, the mobile device 210 and the kiosk device 250 may communicate with one another by coming into contact with one another (e.g., using a magnetic stripe or an IC chip) or via contactless communication (e.g., using NFC).

The mobile ID verifier system 260 may include one or more devices capable of receiving, generating, storing, processing, providing, and/or routing information associated with a mobile ID association tree for connecting shared services, as described elsewhere herein. The mobile ID verifier system 260 may include a communication device and/or a computing device. For example, the mobile ID verifier system 260 may include a server, such as an application server, a client server, a web server, a database server, a host server, a proxy server, a virtual server (e.g., executing on computing hardware), or a server in a cloud computing system. In some implementations, the mobile ID verifier system 260 may include computing hardware used in a cloud computing environment.

The network 270 may include one or more wired and/or wireless networks. For example, the network 270 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 270 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
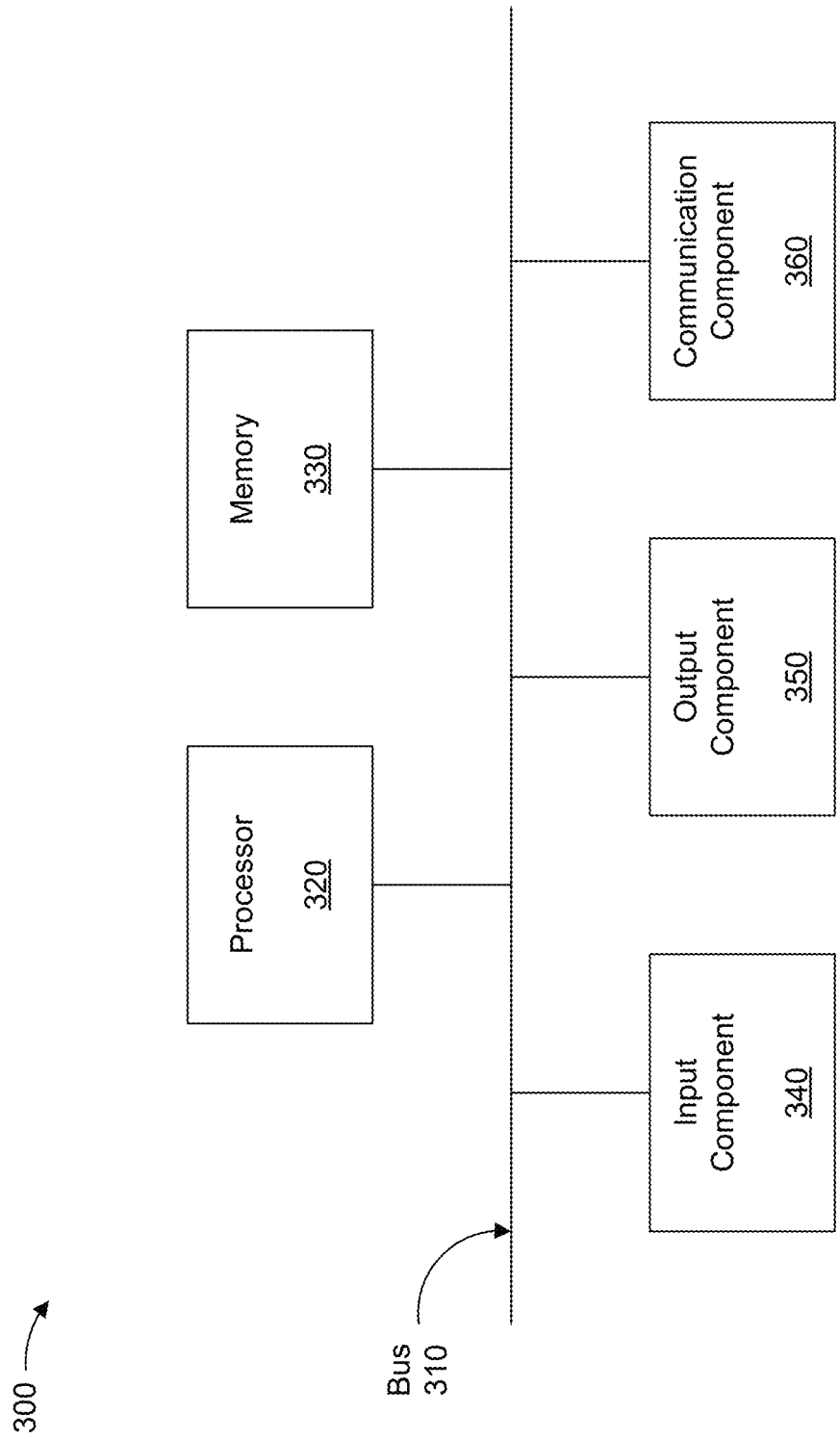
FIG. 3 is a diagram of example components of one or more devices depicted in FIG. 2, in accordance with some embodiments of the present disclosure.

FIG. 3 is a diagram of example components of a device 300 associated with a mobile ID association tree for connecting shared services. The device 300 may correspond to mobile device 210, mobile ID issuer system 220, mobile ID tree orchestration system 230, service provider device 240, kiosk device 250, and/or mobile ID verifier system 260. In some implementations, mobile device 210, mobile ID issuer system 220, mobile ID tree orchestration system 230, service provider device 240, kiosk device 250, and/or mobile ID verifier system 260 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a camera, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
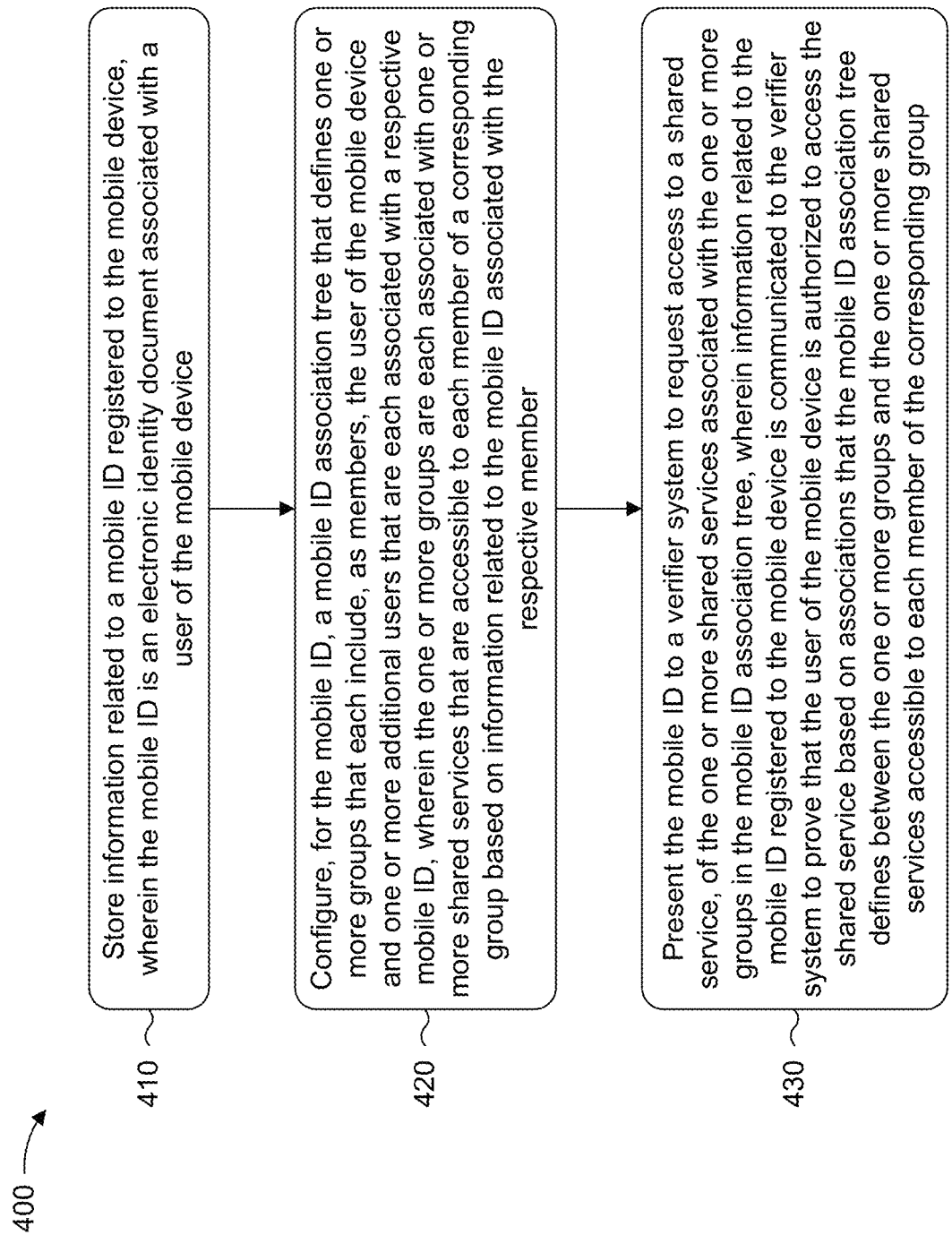
FIG. 4 is a flowchart of an example process associated with a mobile ID association tree for connecting shared services, in accordance with some embodiments of the present disclosure.

FIG. 4 is a flowchart of an example process 400 associated with a mobile ID association tree for connecting shared services. In some implementations, one or more process blocks of FIG. 4 may be performed by the mobile device 210. In some implementations, one or more process blocks of FIG. 4 may be performed by another device or a group of devices separate from or including the mobile device 210, such as the mobile ID issuer system 220, the mobile ID tree orchestration system 230, the service provider device 240, the kiosk device 250, and/or the mobile ID verifier system 260. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include storing information related to a mobile ID registered to the mobile device, wherein the mobile ID is an electronic identity document associated with a user of the mobile device (block 410). For example, the mobile device 210 (e.g., using processor 320 and/or memory 330) may store information related to a mobile ID registered to the mobile device, as described above in connection with reference numbers 102, 104, 106, and 108 of FIG. 1A. In some implementations, the mobile ID is an electronic identity document associated with a user of the mobile device. As an example, a user may use a camera associated with a mobile device to capture one or more images (e.g., a front and back) of a—physical identity document and a photograph (e.g., a selfie) of the user, which may be provided to a mobile ID verifier system (e.g., a computer system configured to verify that the physical identity document is authentic and that the person requesting the mobile ID is the person associated with the physical identity document based on whether the photograph provided by the user device matches a photograph on the physical identity document). Accordingly, in cases where the mobile ID verifier system authenticates the images provided by the user device, the mobile ID verifier system may provision (e.g., transmit) the mobile ID to the user device, which may store the mobile ID in a memory of the user device.

As further shown in FIG. 4, process 400 may include configuring, for the mobile ID, a mobile ID association tree that defines one or more groups that each include, as members, the user of the mobile device and one or more additional users that are each associated with a respective mobile ID, wherein the one or more groups are each associated with one or more shared services that are accessible to each member of a corresponding group based on information related to the mobile ID associated with the respective member (block 420). For example, the mobile device 210 (e.g., using processor 320 and/or memory 330) may configure, for the mobile ID, a mobile ID association tree that defines one or more groups that each include, as members, the user of the mobile device and one or more additional users that are each associated with a respective mobile ID, as described above in connection with reference number 110 and 115 of FIG. 1B and/or reference numbers 120 and 125 of FIG. 1C. In some implementations, the one or more groups are each associated with one or more shared services that are accessible to each member of a corresponding group based on information related to the mobile ID associated with the respective member. As an example, a mobile ID association tree may define one or more groups (e.g., family, friends, or the like), and one or more of the groups may also include one or more sub-groups (e.g., a family group may include parents and siblings sub-groups, a friends group may include roommate and close friends sub-groups, or the like), each of which includes the user of the mobile device as a member and other users that have their own respective mobile IDs (e.g., the user's parents and siblings may also be members of the family group). Furthermore, each group may be associated with one or more shared services such that each user in the group is authorized to access each of the shared services associated with the group (e.g., everyone in the family group may have smart home access, access to emergency medical information, and friends and family discounts, and everyone in the friends group may have access to friends and family discounts and a cloud storage service).

As further shown in FIG. 4, process 400 may include presenting the mobile ID to a verifier system to request access to a shared service, of the one or more shared services associated with the one or more groups in the mobile ID association tree, wherein information related to the mobile ID registered to the mobile device is communicated to the verifier system to prove that the user of the mobile device is authorized to access the shared service based on associations that the mobile ID association tree defines between the one or more groups and the one or more shared services accessible to each member of the corresponding group (block 430). For example, the mobile device 210 (e.g., using processor 320, memory 330, and/or output component 350) may present the mobile ID to a verifier system to request access to a shared service, of the one or more shared services associated with the one or more groups in the mobile ID association tree, as described above in connection with reference number 150 of FIG. 1E. In some implementations, information related to the mobile ID registered to the mobile device is communicated to the verifier system to prove that the user of the mobile device is authorized to access the shared service based on associations that the mobile ID association tree defines between the one or more groups and the one or more shared services accessible to each member of the corresponding group. As an example, the verifier system may be associated with a smart vehicle, in which case the mobile ID stored on the mobile device may be presented to the verifier system, which may read the mobile ID from the mobile device and unlock the smart vehicle for keyless entry based on the mobile ID association tree indicating that the user of the mobile device is included in a group of users has access to the smart vehicle. Furthermore, in some implementations, the verifier system may start the vehicle based on verifying that the mobile ID registered to the mobile device is associated with a valid driver's license and that the mobile ID association tree indicates that the user of the mobile device is included in a group of users that share a car insurance policy.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1G. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A mobile device for configuring shared services, the mobile device comprising:
    one or more memories; and
    one or more processors, coupled to the one or more memories, configured to:
        store information related to a mobile ID registered to the mobile device,
            wherein the mobile ID is an electronic identity document associated with a user of the mobile device;
        configure, for the mobile ID, a mobile ID association tree that defines one or more groups that each include, as members, the user of the mobile device and one or more additional users that are each associated with a respective mobile ID,
            wherein the one or more groups are each associated with one or more shared services that are accessible to each member of a corresponding group based on information related to the mobile ID associated with the respective member; and
        present the mobile ID to a verifier system to request access to a shared service, of the one or more shared services associated with the one or more groups in the mobile ID association tree,
            wherein information related to the mobile ID registered to the mobile device is communicated to the verifier system to prove that the user of the mobile device is authorized to access the shared service based on associations in the mobile ID association tree.

2. The mobile device of claim 1, wherein the one or more processors, to configure the mobile ID association tree, are configured to:
    send, to a second mobile device associated with an organizer user for a group, of the one or more groups defined in the mobile ID association tree, a request to add the user of the mobile device to the group,
        wherein the user of the mobile device is added to the group and granted access to one or more shared services that are accessible to the members of the group based on the organizer user approving the request to add the user of the mobile device to the group.

3. The mobile device of claim 1, wherein the one or more processors, to configure the mobile ID association tree, are configured to:
    receive, from a second mobile device associated with a requesting user, a request to add the requesting user to a group, of the one or more groups defined in the mobile ID association tree, for which the user of the mobile device is an organizer; and
    receive, via a user interface, a selection of an option to approve the request to add the requesting user associated with the second mobile device to the group,
        wherein the requesting user is added to the group and granted access to one or more shared services that are accessible to the members of the group based on the selection of the option to approve the request.

4. The mobile device of claim 1, wherein the one or more processors are configured to:
    display a notification indicating that the user of the mobile device has been added to a group, of the one or more groups defined in the mobile ID association tree, or granted access to one or more shared services that are accessible to the members of the group.

5. The mobile device of claim 1, wherein the one or more processors are configured to:
    display a user interface that includes one or more elements to add one or more users to or remove one or more users from a group, of the one or more groups defined in the mobile ID association tree, to manage access to the one or more shared services associated with the group.

6. The mobile device of claim 1, wherein the one or more processors are configured to:
    display a user interface that includes one or more elements to add one or more shared services to or remove one or more shared services from a group, of the one or more groups defined in the mobile ID association tree, to manage the one or more shared services that are accessible to the members of the group.

7. The mobile device of claim 1, wherein the one or more processors are configured to:
receive, via a first application associated with a shared service, a request to integrate the shared service into the mobile ID association tree;
push one or more permissions associated with the shared service from the first application associated with the shared service to a second application associated with the mobile ID association tree based on the request; and
receive, via the second application associated with the mobile ID association tree, one or more inputs to associate the shared service with one or more groups, of the one or more groups defined in the mobile ID association tree.

8. The mobile device of claim 1, wherein the one or more processors are configured to:
receive, via a first application associated with the mobile ID association tree, a request to integrate a shared service into the mobile ID association tree;
pull one or more permissions associated with the shared service from a second application associated with the shared service into the second application associated with the mobile ID association tree based on the request; and
receive, via the first application associated with the mobile ID association tree, one or more inputs to associate the shared service with one or more groups, of the one or more groups defined in the mobile ID association tree.

9. The mobile device of claim 1, wherein the one or more processors are configured to:
capture one or more images of a physical identity document associated with the user of the mobile device;
capture a facial image of the user of the mobile device;
send, to a mobile ID verifier system, the one or more images of the physical identity document and the image of the user of the mobile device; and
receive, from the mobile ID verifier system, the information related to the mobile ID registered to the mobile device based on the mobile ID verifier system confirming that the physical identity document is authentic and that the facial image of the user of the mobile device matches a picture on the physical identity document.

10. A method for leveraging a mobile ID to connect shared services, comprising:
storing, by a mobile device, information related to a mobile ID registered to the mobile device,
wherein the mobile ID is an electronic identity document associated with a user of the mobile device;
configuring, by the mobile device, for the mobile ID, a mobile ID association tree that defines one or more groups that each include, as members, the user of the mobile device and one or more additional users that are each associated with a respective mobile ID,
wherein the one or more groups are each associated with one or more shared services that are accessible to each member of a corresponding group based on information related to the mobile ID associated with the respective member; and
presenting, by the mobile device, the mobile ID to a verifier system to request access to a shared service of the one or more shared services,
wherein information related to the mobile ID registered to the mobile device is communicated to the verifier system to prove that the user of the mobile device is authorized to access the shared service based on associations in the mobile ID association tree.

11. The method of claim 10, wherein configuring the mobile ID association tree comprises:
receiving, from a second mobile device associated with an organizer user for a group, of the one or more groups defined in the mobile ID association tree, an invitation to join the group associated with the organizer user,
wherein the user of the mobile device is added to the group and granted access to one or more shared services that are accessible to the members of the group based on the user of the mobile device accepting the invitation.

12. The method of claim 10, wherein configuring the mobile ID association tree comprises:
sending, to a second mobile device associated with a second user, an invitation to join a group, of the one or more groups defined in the mobile ID association tree, for which the user of the mobile device is an organizer; and
receiving, from the second mobile device, an indication that the second user accepted the invitation to join the group,
wherein the second user is added to the group and granted access to one or more shared services that are accessible to the members of the group based on the second user accepting the invitation to join the group.

13. The method of claim 10, comprising:
displaying a notification indicating that the user of the mobile device has been added to a group, of the one or more groups defined in the mobile ID association tree, or granted access to one or more shared services that are accessible to the members of the group.

14. The method of claim 10, comprising:
displaying a user interface that includes one or more elements to add one or more users to or remove one or more users from a group, of the one or more groups defined in the mobile ID association tree, to manage access to the one or more shared services associated with the group.

15. The method of claim 10, comprising:
displaying a user interface that includes one or more elements to add one or more shared services to or remove one or more shared services from a group, of the one or more groups defined in the mobile ID association tree, to manage the one or more shared services that are accessible to the members of the group.

16. A non-transitory computer-readable medium storing a set of instructions, the set of instructions comprising:
one or more instructions that, when executed by one or more processors of a mobile device, cause the mobile device to:
store information related to a mobile ID registered to the mobile device,
wherein the mobile ID is an electronic identity document associated with a user of the mobile device;
configure, for the mobile ID, a mobile ID association tree that defines one or more groups that each include, as members, the user of the mobile device and one or more additional users that are each associated with a respective mobile ID,
wherein the one or more groups are each associated with one or more shared services that are accessible to each member of a corresponding group based on information related to the mobile ID associated with the respective member;
display a user interface that includes one or more elements to manage the users that are included in the one or more groups and the one or more shared services that are accessible to the members of the one or more groups; and
present the mobile ID to a verifier system to request access to a shared service, of the one or more shared services associated with the one or more groups,
wherein information related to the mobile ID registered to the mobile device is communicated to the verifier system to prove that the user of the mobile device is authorized to access the shared service based on associations in the mobile ID association tree.

17. The non-transitory computer-readable medium of claim 16, wherein the one or more instructions, that cause the mobile device to configure the mobile ID association tree, cause the mobile device to:
send, to a second mobile device associated with an organizer user for a group, of the one or more groups defined in the mobile ID association tree, a request to add the user of the mobile device to the group,
wherein the user of the mobile device is added to the group and granted access to one or more shared services that are accessible to the members of the group based on the organizer user approving the request to add the user of the mobile device to the group.

18. The non-transitory computer-readable medium of claim 16, wherein the one or more instructions, that cause the mobile device to configure the mobile ID association tree, cause the mobile device to:
receive, from a second mobile device associated with a requesting user, a request to add the requesting user to a group, of the one or more groups defined in the mobile ID association tree, for which the user of the mobile device is an organizer; and
receive, via the user interface, a selection of an option to approve the request to add the requesting user associated with the second mobile device to the group,
wherein the requesting user is added to the group and granted access to one or more shared services that are accessible to the members of the group based on the selection of the option to approve the request.

19. The non-transitory computer-readable medium of claim 16, wherein the one or more instructions further cause the mobile device to:
display a notification indicating that the user of the mobile device has been added to a group, of the one or more groups defined in the mobile ID association tree, or granted access to one or more shared services that are accessible to the members of the group.

20. The method of claim 10, further comprising:
receiving, via a first application associated with another shared service, a request to integrate the shared service into the mobile ID association tree;
pushing one or more permissions associated with the shared service from the first application to a second application associated with the mobile ID association tree based on the request; and
receiving, via the second application, one or more inputs to associate the shared service with at least on group, of the one or more groups defined in the mobile ID association tree.

\* \* \* \* \*